(12) United States Patent
Nerieri et al.

(10) Patent No.: US 8,311,041 B1
(45) Date of Patent: Nov. 13, 2012

(54) SYSTEMS AND METHODS FOR AUTOMATICALLY ADJUSTING MESSAGING QUOTA

(75) Inventors: Francesco Nerieri, Santa Cruz, CA (US); Angana Ghosh, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/557,827

(22) Filed: Jul. 25, 2012

Related U.S. Application Data

(60) Provisional application No. 61/663,217, filed on Jun. 22, 2012.

(51) Int. Cl.
*H04L 12/28* (2006.01)
(52) U.S. Cl. ........ 370/390; 709/203; 709/217; 370/328; 455/456.6
(58) Field of Classification Search .................. 709/203, 709/217; 370/328, 390; 455/456.6
See application file for complete search history.

(56) References Cited

U.S. PATENT DOCUMENTS

| | | | |
|---|---|---|---|
| 6,807,427 B1* | 10/2004 | Sakamoto et al. | 455/456.1 |
| 2006/0047665 A1* | 3/2006 | Neil | 707/10 |
| 2006/0190526 A1* | 8/2006 | Neil et al. | 709/203 |
| 2008/0233979 A1* | 9/2008 | Li | 455/466 |
| 2009/0279489 A1 | 11/2009 | Deu-Ngoc et al. | |
| 2011/0087725 A9* | 4/2011 | Neil et al. | 709/203 |
| 2012/0033616 A1* | 2/2012 | Sun | 370/328 |
| 2012/0147887 A1* | 6/2012 | Fan et al. | 370/390 |
| 2012/0185542 A1* | 7/2012 | Vyrros et al. | 709/206 |

* cited by examiner

*Primary Examiner* — Phuoc Nguyen
(74) *Attorney, Agent, or Firm* — Troutman Sanders LLP; James E. Schutz; Mark Lehi Jones

(57) ABSTRACT

Certain embodiments of the disclosed technology may include systems and methods for automatically adjusting messaging quota. According to an implementation of the disclosed technology, a computer-implemented method is provided for determining a first user base size; determining a first push message volume corresponding to the first user base size; setting a push message quota based at least in part on the first push message volume; determining a second user base size; determining an estimated push message volume based at least in part on the second user base size and the first push message volume; determining a second push message volume corresponding to the second user base size; comparing the estimated push message volume to the second push message volume; and adjusting the push message quota based at least in part on the comparison of the estimated push message volume to the second push message volume.

20 Claims, 5 Drawing Sheets

SYSTEMS AND METHODS FOR AUTOMATICALLY ADJUSTING MESSAGING QUOTA

RELATED APPLICATIONS

This application is related to provisional application Ser. No. 61/663,217, filed on Jun. 22, 2012, entitled: "Systems and Methods for Automatically Adjusting Messaging Quota," the contents of which are hereby incorporated by reference in their entirety.

FIELD

This disclosed technology generally relates to push notifications or messaging, and in particular to automatically adjusting messaging quota.

BACKGROUND

Push notification services are in widespread use for sending messages to mobile devices and desktop computers. For example, push notifications or messages may be sent from e-mail servers to a user's device when a new email arrives for the user. The push service can help take the burden off the user's device and can save battery life of a mobile device because it does not need to continuously check to see if new e-mail or other information has arrived at the server.

Push messaging has continued to play an expanding role in operating ecosystems of both desktop and mobile devices. Messages, notifications, visual alerts, etc., are typically sent from application provider servers to the end user's device via a messaging server. As more end users download or subscribe to applications and opt-in to allow push messages, the more important quotas become for controlling the number of push messages that an application provider can send.

BRIEF SUMMARY

Some or all of the above needs may be addressed by certain embodiments of the disclosed technology. Certain embodiments of the disclosed technology may include systems and methods for automatically adjusting messaging quota.

According to an implementation of the disclosed technology, a computer-implemented method is provided. The method includes determining a first user base size. In an implementation, the user base size corresponds to a number of users subscribed to receive push messages for an application. In an implementation, the method includes determining a first push message volume corresponding to the first user base size. In an implementation, the message volume corresponds to a number of messages sent by an application provider entity during a predetermined period. In an implementation, the method includes setting a push message quota based at least in part on the first push message volume; determining a second user base size; determining an estimated push message volume based at least in part on the second user base size and the first push message volume; and determining a second push message volume corresponding to the second user base size. In an implementation, the method includes comparing the estimated push message volume to the second push message volume, and adjusting the push message quota based at least in part on the comparison of the estimated push message volume to the second push message volume.

According to another implementation, a computing system is provided. The system includes a processing device and a storage device, operatively connected to the processing device, having stored thereon executable instructions that, when executed, causes the computing system to: determine a first user base size. In an implementation, the user base size corresponds to a number of users subscribed to receive push messages for an application. According to an implementation, the executable instructions further cause the computing system to determine a first push message volume corresponding to the first user base size. In implementations, the message volume corresponds to a number of messages sent by an application provider entity during a predetermined period. According to an implementation, the executable instructions further cause the computing system to set a push message quota based at least in part on the first push message volume; determine a second user base size; determine an estimated push message volume based at least in part on the second user base size and the first push message volume; and determine a second push message volume corresponding to the second user base size. According to an implementation, the executable instructions further cause the computing system to compare the estimated push message volume to the second push message volume; and adjust the push message quota based at least in part on the comparison of the estimated push message volume to the second push message volume.

According to another implementation, a non-transitory computer-readable medium that stores instructions executable by one or more processors to perform a method is provided. The method includes determining a first user base size. In an implementation, the user base size corresponds to a number of users subscribed to receive push messages for an application. In an implementation, the method includes determining a first push message volume corresponding to the first user base size. In an implementation, the message volume corresponds to a number of messages sent by an application provider entity during a predetermined period. In an implementation, the method includes setting a push message quota based at least in part on the first push message volume; determining a second user base size; determining an estimated push message volume based at least in part on the second user base size and the first push message volume; and determining a second push message volume corresponding to the second user base size. In an implementation, the method includes comparing the estimated push message volume to the second push message volume, and adjusting the push message quota based at least in part on the comparison of the estimated push message volume to the second push message volume.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
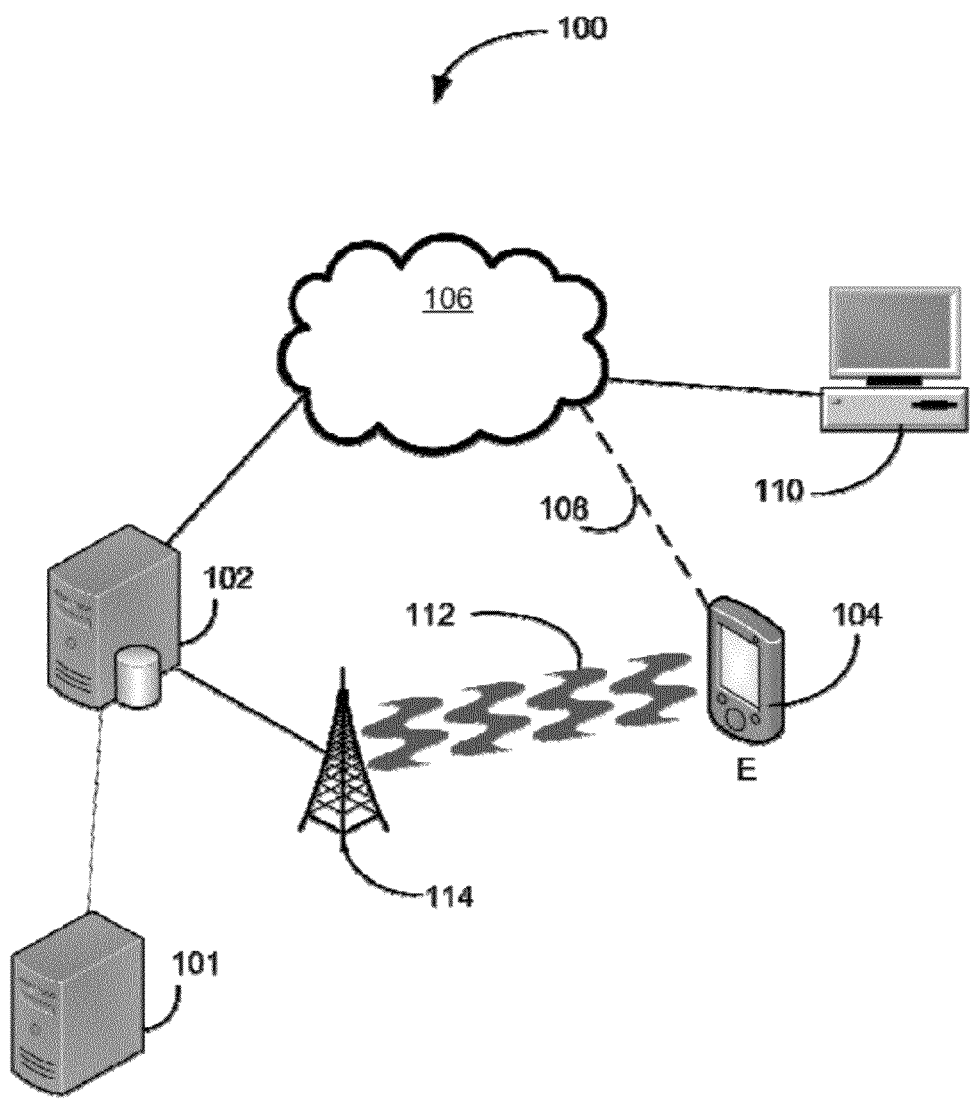
FIG. 1 is a block diagram of an illustrative push messaging system 100 according to an implementation of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "one implementation," "an implementation," "various embodiments," etc., indicate that the embodiment(s) or implementations of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Current schemes for messaging quotas involve manual requests, adjustments, etc. For example, if a particular application (app) is popular, the app developer may contact the manager of the messaging server to request an increase in the number of allowable messages that the app developer can send to the end user via the messaging server. Implementations of the disclosed technology may automatically assign and adjust user quotas for push messaging based on usage patterns and other analytics. For example, messaging quotas may be increased based on the application user base growth. In certain implementations, detected user abuse and/or detected delay-of-service issues may be utilized to restrict the number of push messages that can be sent over a given period.

To illustrate a situation where embodiments of the disclosed technology may be utilized, consider the following example: an application developer "manysportscores.com" sends messages to all its subscribed users when teams selected by the users have an updated score. The application developer initially has a user base of 5000 users, and a reasonable amount of message updates per day, per user is approximately 20. An initial quota for the application developer may be set at 100,000. Now consider what may happen if the app for manysportscores.com is featured in advertising or, highlighted in an application portal, which results in a sudden increase of the user base to 100,000 installs. The messaging quota may need to be increased to 2,000,000 to accommodate the new user base. According to implementations, the disclosed technology may detect that the user base has grown, and may retrieve information about how many messages were sent previously with the old user base. Implementations of the disclosed technology may estimate the quota based on previous usage and growth of user base. According to an implementation, if the actual messaging usage differs significantly from the estimated quota, then an indication of misuse/abuse may be generated. In one implementation, if abuse is confirmed, then the app messages may be blocked. If abnormal behavior is detected, according to one embodiment, a flag may be set as a warning. In another implementation, a development team may reach out and provide best coding practices to the application developer based on indications of misuse or abuse. In an implementation, usage more than 20% above the quota may trigger a flag or warning. In another implementation, usage of more than 10% above the quota may trigger a flag or warning. According to an implementation, usage of greater than twice the quota may create at flag or warning, with messages that may be blocked or held. In another implementation, an application developer's history of violating quotas may be taken into account before blocking messages.

In accordance with implementations of the disclosed technology, user base, usage patterns, and/or application features may be monitored and analyzed to determine an expected messaging usage number. In certain implementations, the messaging quota may be automatically adjusted accordingly. In one embodiment, multiple signals from multiple installs may be monitored, for example, to determine a percentage of successfully delivered messages. This information may be used to detect abuse by application providers or developers, for example, who may indiscriminately send push messages or unknowingly violate reasonable push messaging quotas.

Various techniques, methods, and systems may be utilized for monitoring messaging volume and automatically adjusting messaging quota, according to implementations of the disclosed technology, and will now be described with reference to the accompanying figures.

FIG. 1 is a block diagram of an illustrative push messaging system 100 according to an implementation of the disclosed technology. The system 100 may include an application provider server 101 in communication with an application messaging server 102. The application messaging server 102 may include architecture, associated memory storage, peripherals, etc. that will be subsequently discussed with reference to FIG. 3. The application messaging server 102 may receive notifications from the application provider server 101, and may communicate the received notifications to a mobile device 104 or a desktop/laptop computer 110 by push messages. Those skilled in the art recognize that there are several categories of mobile devices 104, generally known as portable computing devices that can run on batteries but are not usually classified as laptops. For example, mobile devices 104 can include, but are not limited to portable computers, tablet PCs, Internet tablets, PDAs, ultra mobile PCs (UMPCs) and smart phones.

In an implementation, and with continued reference to FIG. 1, the server 102 may communicate with the mobile device 104 or with the desktop/laptop device 110 through a Wi-Fi™ channel or some other Internet connection 108, for example, and may utilize cloud services or the Internet connection 106 for communication between the mobile device 104 and the server 102. According to an implementation, the server 102 may communicate to the mobile device 104 through a service provider 114. For example, the service provider 114 may provide cellular service through cellular radio channels 112 for communicating with the mobile device 104. According to implementations of the disclosed technology, the server 102 may communicate or send messages to the mobile device 104 through the service provider 114.

According to implementations, there may be situations where the mobile device is not in range of a Wi-Fi™ channel or other Internet connection 106, and any communications with the server may then transpire via the service provider 114. However, in situations where the mobile device 104 has a connection 108 to the Internet 106, the server 102 may communicate with the mobile device 104 (for at least a certain class of signals and messages) without needing to utilize the service provider 114.

Figure 2:
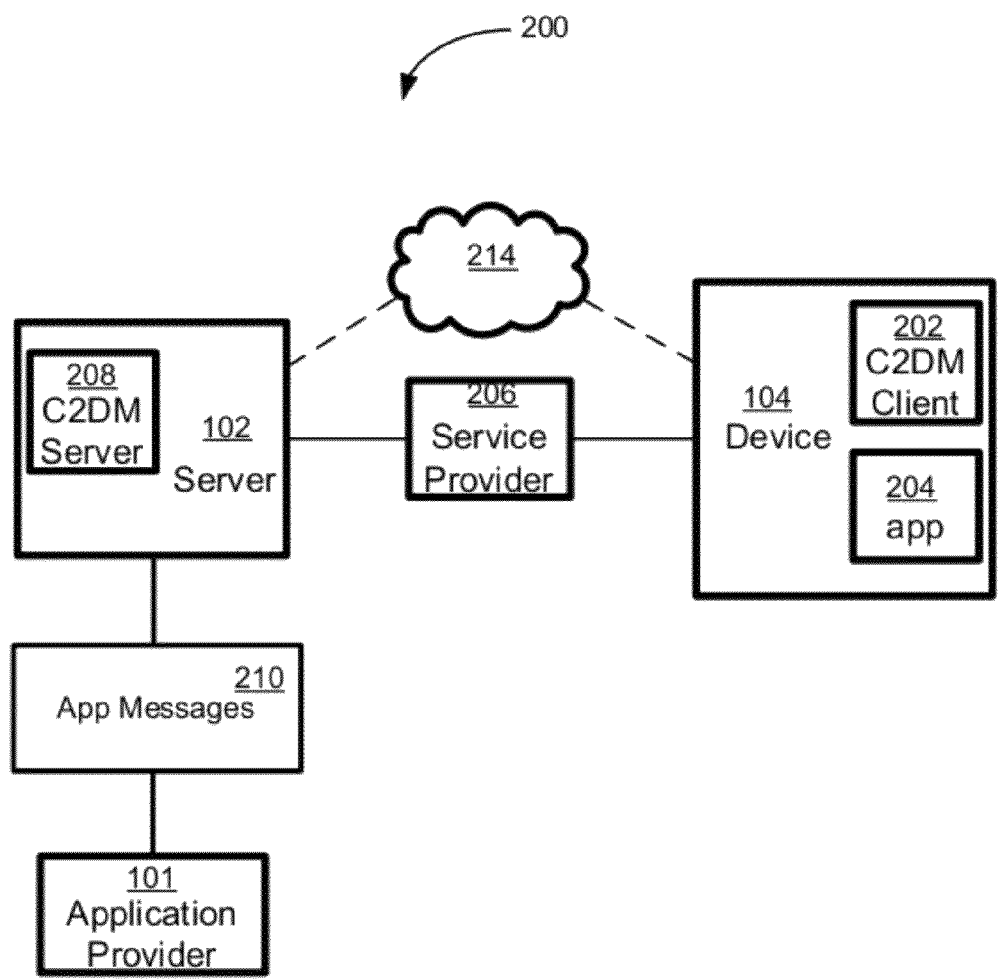
FIG. 2 is a block diagram of an illustrative application message communications system 200, according to an implementation of the disclosed technology.

FIG. 2 is a block diagram of an illustrative application message communications system 200, according to an implementation of the disclosed technology.

In one embodiment, an application provider 101 or other service may send a message 210 to the application messaging server 102 for delivery to the mobile device 104. Messages 210, for example, may include, but are not limited to, a push messages, notifications, updates, etc. For example, the mobile device may be subscribed to application notification services that send sports scores, weather updates, traffic alerts, etc. periodically to the mobile device.

In an implementation, the messages 210 may be delivered from the application messaging server 102 via a cloud to device messaging (C2DM) server 208 to a C2DM client 202 at the mobile device 104 for use with the mobile app 204. According to implementations of the disclosed technology, the application provider 101 sends messages to the device 104 via the application messaging server 102 and; therefore, delivery of the push notifications may be controlled by the application messaging server 102.

According to certain implementations of the disclosed technology, the application messaging server 102 may provide limits or quotas on the number of messages 210 that the application provider 101 can send to end users. In one implementation, a user base size may be estimated by monitoring the number of downloads and installs of particular applications 204. According to an implementation, push messages may be monitored to determine an average rate of push messages per installed application. In implementations, the quota may be automatically set based on a product of the user base size and the average rate of push messages per installed application. In certain implementations, a rate of change of the user base and/or a rate of change in the number of push messages per installed application may be utilized to modify the push message quota.

In an implementation, the quota may have a built-in cushion. For example, depending on factors such as the scale of the system, the scale of the user base, information about the popularity of the application, etc., the quota may be based on the user-base size (number of users) multiplied by the average number of messages per users multiplied by a cushion ranging from approximately 110 percent to 200 percent. According to an implementation, the system may be configured to provide alerts or flags when a messaging quota has been exceeded, for example, so that further analysis can be made to determine if the change in messaging was legitimate (i.e., based on app popularity change, user base change, etc.,) or if there is messaging volume abuse that may require further action. In an implementation, if abuse is detected, As an example, consider an application that has started sending messages with a volume above 60% of quota limit. According to an implementation, the system may automatically check signals, databases, or other information sources to determine if it was an anomaly or not. In one scenario, it may be that the application was recently featured on an application portal or given away for free, resulting in many new downloads and causing a big spike in the user base. In this scenario, reaching 60% or more of the quota limit may make sense and the system may automatically increase the quota limit by 50% to 100%, for example. In an implementation, if the system does not find any such justification for the increased volume, then the account may be flagged for abuse, and reduced quota 10 to 30% increase.

Figure 3:
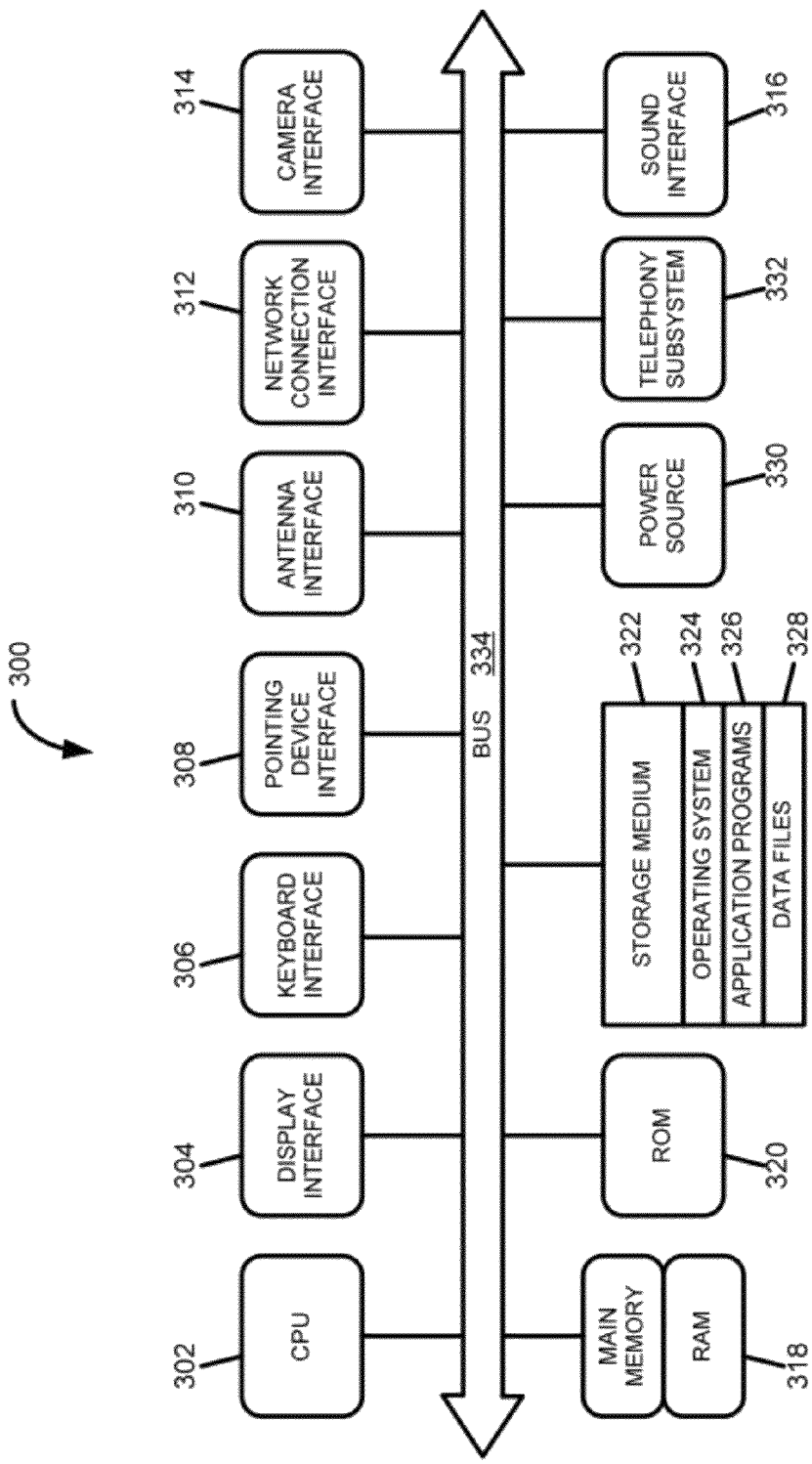
FIG. 3 is a block diagram of an illustrative computer server system 300, according to an implementation of the disclosed technology.

Various embodiments of the communication systems and methods herein may be embodied in non-transitory computer readable media for execution by a processor. An implementation may be used in an application of a messaging server, but other computing devices may also be used. FIG. 3 illustrates schematic diagram of internal computer architecture 300 of an exemplary messaging server. It will be understood that the architecture 300 illustrated in FIG. 3 is provided for exemplary purposes only and does not limit the scope of the various embodiments of the communication systems and methods.

The computer architecture 300 of FIG. 3 includes a central processing unit (CPU) 302, where computer instructions are processed. In an implementation, the a display interface 304 that acts as a communication interface and provides functions for rendering video, graphics, images, and texts on the display, provides a set of built-in controls (such as buttons, text, and lists), and supports diverse screen sizes; a keyboard interface 306 that provides a communication interface to a keyboard; a pointing device interface 308 that provides a communication interface to a pointing device; an antenna interface 310 that provides a communication interface to an antenna; a network connection interface 312 that provides a communication interface to a network; a camera interface 314 that acts as a communication interface and provides functions for capturing digital images from a camera; a sound interface 316 that provides a communication interface for converting sound into electrical signals using a microphone and for converting electrical signals into sound using a speaker; a random access memory (RAM) 318 where computer instructions and data are stored in a volatile memory device for processing by the CPU 302; a read-only memory (ROM) 320 where invariant low-level systems code or data for basic system functions such as basic input and output (I/O), startup, or reception of keystrokes from a keyboard are stored in a non-volatile memory device; a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that include an operating system 324, application programs 326 (including, for example, a web browser application, a widget or gadget engine, and or other applications, as necessary) and data files 328 are stored; a power source 330 that provides an appropriate alternating current (AC) or direct current (DC) to power components; and a telephony subsystem 332 that allows the device 300 to transmit and receive sound over a telephone network. The constituent devices and the CPU 302 communicate with each other over a bus 334.

The CPU 302 has appropriate structure to be a computer processor. In one arrangement, the computer CPU 302 is more than one processing unit. The RAM 318 interfaces with the computer bus 334 so as to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

In accordance with implementation, the application programs 326 may include, but are not limited to cloud to device messaging (C2DM) applications, messaging monitoring, quota setting programs, and alert generating programs. The alerts may be generated, for example, to notify personnel when an application provider exceeds (or is about to exceed) messaging quotas.

Figure 4:
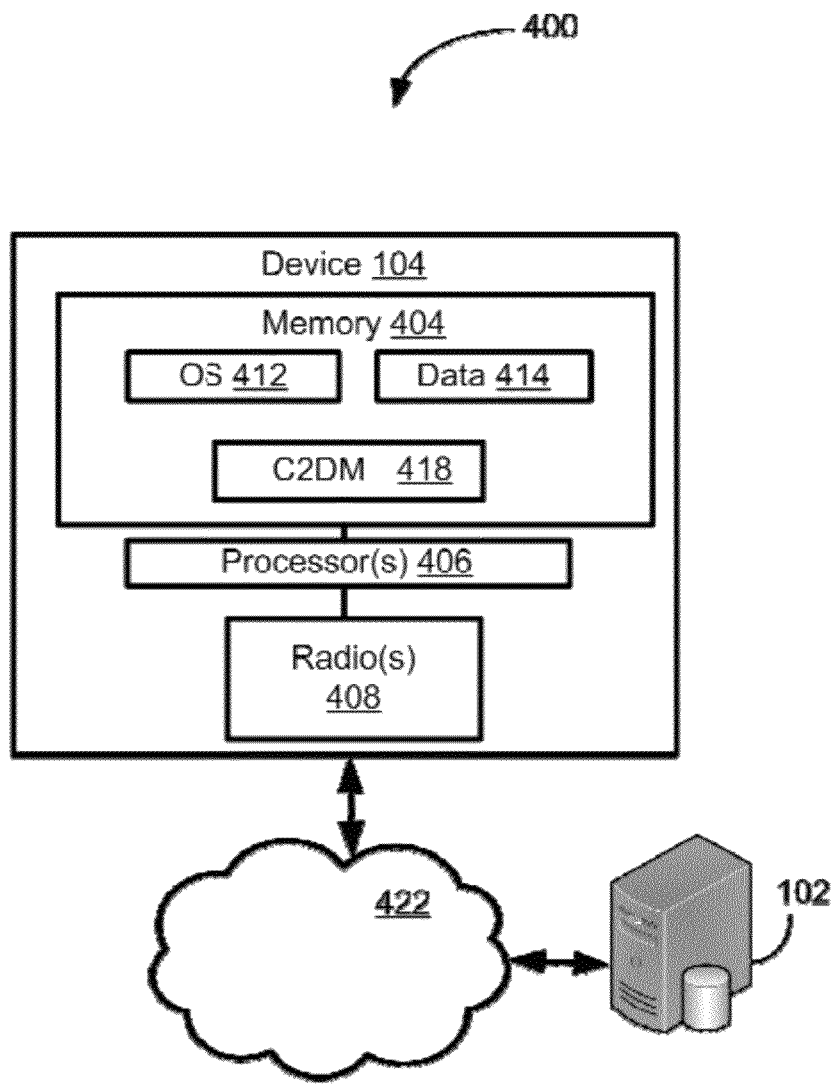
FIG. 4 is a block diagram of an illustrative mobile device system 400, according to an implementation of the disclosed technology.

FIG. 4 depicts a block diagram of an illustrative mobile device system 400, according to an implementation of the disclosed technology. In accordance with an implementation of the disclosed technology, a mobile device 104 may be in communication with a messaging server 102 through a communication channel 422 that may include one or more of a service provider (as in service provider 114 of FIG. 1) or the Internet (as in the Internet 106 and Internet connection 108 of FIG. 1). According to an implementation, the mobile device 104 includes a memory 404, one or more processors 406 in communication with the memory 404, and one or more radios 408 in communication with the one or more processors 406. According to an implementation, the memory 404 includes an operating system 412, data 414, and one or more communication modules. For example, the memory may include a C2DM client module 418 for receiving cloud to device messaging notifications.

Figure 5:
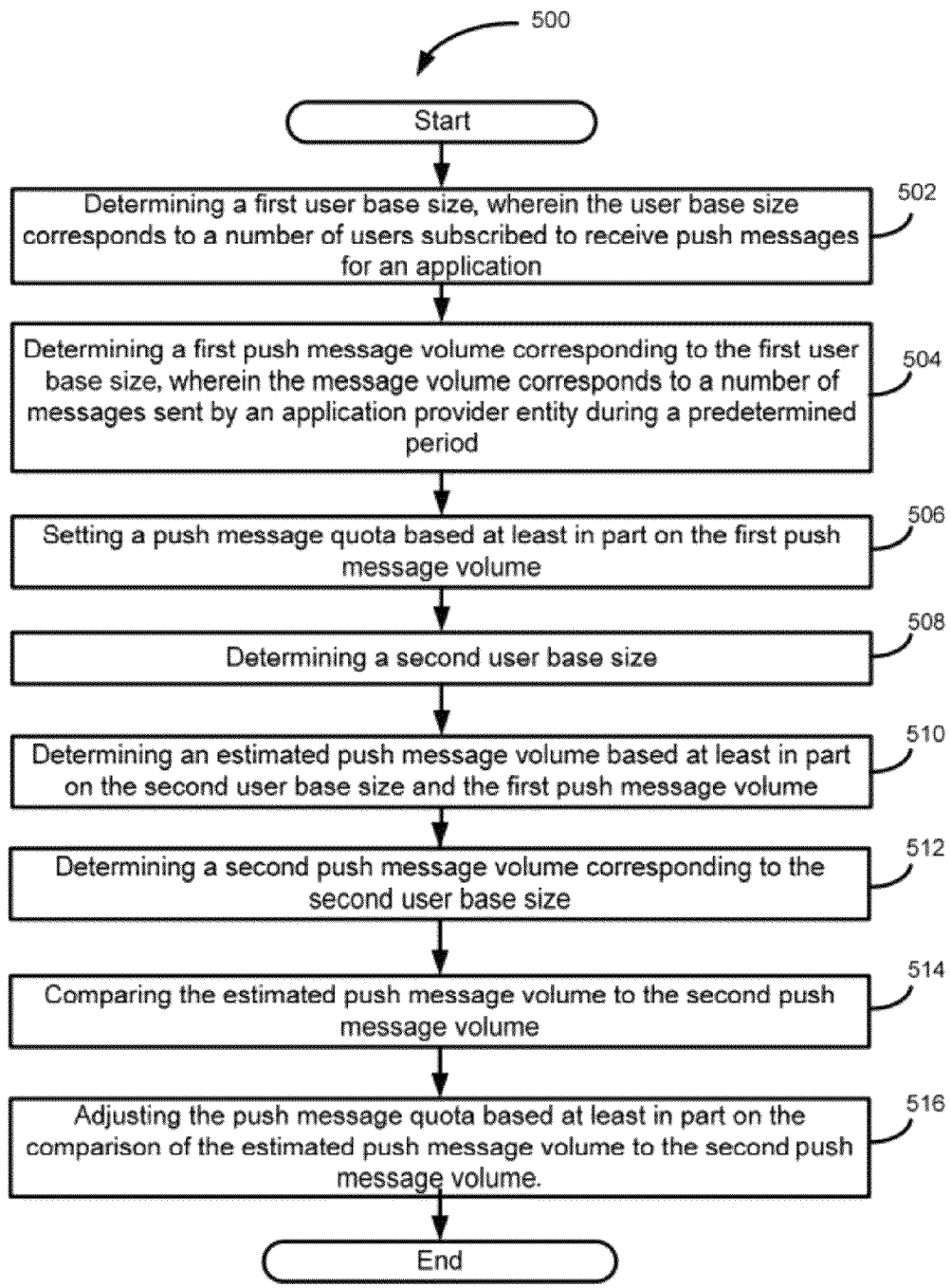
FIG. 5 is a flow diagram of a method according to an implementation of the disclosed technology.

An exemplary method 500 for automatically setting or adjusting messaging quotas will now be described with reference to the flowchart of FIG. 5. The method 500 starts in block 502, and according to an implementation of the disclosed technology includes determining a first user base size, wherein the user base size corresponds to a number of users subscribed to receive push messages for an application. In block 504, the method 500 includes determining a first push message volume corresponding to the first user base size, wherein the message volume corresponds to a number of messages sent by an application provider entity during a predetermined period. In block 506, the method 500 includes setting a push message quota based at least in part on the first push message volume. In block 508, the method 500 includes determining a second user base size. In block 510, the method 500 includes determining an estimated push message volume based at least in part on the second user base size and the first push message volume. In block 512, the method 500 includes determining a second push message volume corresponding to the second user base size. In block 514, the method 500 includes comparing the estimated push message volume to the second push message volume. In block 516, the method 500 includes adjusting the push message quota based at least in part on the comparison of the estimated push message volume to the second push message volume. The method 500 ends after block 516.

Implementations of the method 500 may be implemented via a non-transitory computer-readable medium that stores instructions executable by one or more processors to perform the method. Implementations of the method 500 may further be implemented by a processing device having a storage device, operatively connected to the processing device, having stored thereon executable instructions that, when executed, cause the processing device perform the method 500.

Implementations may further include adjusting the push message quota based on the estimated push message volume. Implementations further include adjusting the push message quota based on the second push message volume. According to an implementation, setting the push message quota includes setting the push message quota to a value greater than or equal to the determined first push message volume.

According to an implementation, adjusting the push message quota may include adjusting the push message quota to a value greater than or equal to the determined estimate of push message volume if the determined second push message volume is within a predetermined percentage of the determined estimate of push message volume.

According to one implementation, the push message quota may be adjusted to a value greater than or equal to the determined estimate of push message volume if the determined second push message volume is within a predetermined percentage range of the determined estimate of push message volume. For example, the push message quota may be adjusted to a value greater than or equal to the determined estimate of push message volume if the determined second push message volume is between approximately 60 percent to 200 percent of the determined estimate of push message volume. According to implementations, the relative change in the push message quota adjustment may be based on factors including, but not limited to messaging application popularity changes, the size or scale of the user-base, size or limitations of the system, and history of the abuse or compliance by the application provider.

In accordance with certain implementations, the executable instructions, when executed, further cause the processing device to send an alert if the determined second push message volume is greater than or equal to the determined estimate of push message volume. In accordance with certain implementations, the executable instructions, when executed, further adjust the push message quota based on one or more of determined user base growth, historical message volume, successfully delivered messages, or application features.

In accordance with certain implementations, the executable instructions, when executed, further cause the processing device to determine the number of users subscribed to receive push messages for the application. According to certain implementations, the number of users subscribed to receive push messages for the application include a number of users who register for push messages for the application. According to certain implementations, the number of users subscribed to receive push messages for the application include a number of downloads of the application. According to certain implementations, the number of users subscribed to receive push messages for the application include a number of estimated downloads of the application.

According to implementations, certain technical effects can be provided, such as creating certain methods and apparatus that provide automatic adjustment of messaging quotas.

Implementations of the disclosed technology can provide the further technical effects of providing methods and apparatus for eliminating manual request and approvals for increasing messaging quotas. Implementations of the disclosed technology can provide the further technical effects of providing methods and apparatus for detecting unusual messaging behavior and providing remedies when necessary.

In implementations of the disclosed technology, the messaging system 100, the application message communications system 200, the computer server system 300, and/or mobile device system 400 may include any number of hardware and/or software applications that are executed to facilitate any of the operations. In implementations, one or more I/O interfaces may facilitate communication between the messaging system 100, the application message communications system 200, the computer server system 300, and/or mobile device system 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the messaging system 100, the application message communications system 200, the computer server system 300, and/or mobile device system 400. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the messaging system 100, the application message communications system 200, the computer server system 300, and/or mobile device system 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the messaging system 100, the application message communications system 200, the computer server system 300, and/or mobile device system 400 with more or less of the components illustrated in FIGS. 1 through 4.

Certain embodiments of the disclosed technology are described above with reference to block and flow diagrams of systems and methods and/or computer program products according to implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain embodiments of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing system comprising:
at least one processing device; and a storage device, operatively connected to the processing device, having stored thereon executable instructions that, when executed by the at least one processing device, cause the computing system to:
  determine a first user base size, wherein the user base size corresponds to a number of users subscribed to receive push messages for an application;
  determine a first push message volume corresponding to the first user base size, wherein the message volume corresponds to a number of messages sent by an application provider entity during a predetermined period;
  set a push message quota based at least in part on the first push message volume;
  determine a second user base size;
  determine an estimated push message volume based at least in part on the second user base size and the first push message volume;
  determine a second push message volume corresponding to the second user base size;
  compare the estimated push message volume to the second push message volume; and
  adjust the push message quota based at least in part on the comparison of the estimated push message volume to the second push message volume.

2. The system of claim 1, further comprising adjusting the push message quota based on the estimated push message volume.

3. The system of claim 1, further comprising adjusting the push message quota based on the second push message volume.

4. The system of claim 1, wherein setting the push message quota comprises setting the push message quota to a value greater than or equal to the determined first push message volume.

5. The system of claim 1, wherein adjusting the push message quota comprises adjusting the push message quota to a value greater than or equal to the determined estimate of push message volume if the determined second push message volume is within a predetermined percentage of the determined estimate of push message volume.

6. The system of claim 1, wherein adjusting the push message quota comprises adjusting the push message quota to a value less than or equal to the determined estimate of push message volume if the determined second push message volume is less than a predetermined percent of the determined estimate of push message volume.

7. The system of claim 1, wherein the executable instructions, when executed, further adjust the push message quota based on one or more of determined user base growth, historical message volume, successfully delivered messages, or application features.

8. A computer-implemented method comprising:
  determining a first user base size, wherein the user base size corresponds to a number of users subscribed to receive push messages for an application;
  determining a first push message volume corresponding to the first user base size, wherein the message volume corresponds to a number of messages sent by an application provider entity during a predetermined period;
  setting a push message quota based at least in part on the first push message volume;
  determining a second user base size;
  determining an estimated push message volume based at least in part on the second user base size and the first push message volume;
  determining a second push message volume corresponding to the second user base size;
  comparing the estimated push message volume to the second push message volume; and
  adjusting the push message quota based at least in part on the comparison of the estimated push message volume to the second push message volume.

9. The computer-implemented method of claim 8, further comprising adjusting the push message quota based on one or more of the estimated push message volume or the second push message volume.

10. The computer-implemented method of claim 8, wherein setting the push message quota comprises setting the push message quota to a value greater than or equal to the determined first push message volume.

11. The computer-implemented method of claim 8, wherein adjusting the push message quota comprises:
  adjusting the push message quota to a value greater than or equal to the determined estimate of push message volume if the determined second push message volume is within a predetermined percentage of the determined estimate of push message volume; and
  adjusting the push message quota comprises adjusting the push message quota to a value less than or equal to the determined estimate of push message volume if the determined second push message volume is less than a predetermined percentage of the determined estimate of push message volume.

12. The computer-implemented method of claim 8, further comprising sending an alert if the determined second push message volume is greater than or equal to the determined estimate of push message volume.

13. The computer-implemented method of claim 8, further comprising adjusting the push message quota based on one or more of determined user base growth, historical message volume, successfully delivered messages, or application features.

14. The computer-implemented method of claim 8, wherein the number of users subscribed to receive push messages for an application comprises one or more of a number of users who register for push messages for the application or a number of downloads of the application.

15. A non-transitory computer-readable medium that stores instructions executable by one or more processors to perform a method comprising:
  determining a first user base size, wherein the user base size corresponds to a number of users subscribed to receive push messages for an application;
  determining a first push message volume corresponding to the first user base size, wherein the message volume corresponds to a number of messages sent by an application provider entity during a predetermined period;
  setting a push message quota based at least in part on the first push message volume;
  determining a second user base size;
  determining an estimated push message volume based at least in part on the second user base size and the first push message volume;
  determining a second push message volume corresponding to the second user base size;
  comparing the estimated push message volume to the second push message volume; and
  adjusting the push message quota based at least in part on the comparison of the estimated push message volume to the second push message volume.

16. The computer-readable medium of claim 15, further comprising adjusting the push message quota based on one or more of the estimated push message volume or the second push message volume.

17. The computer-readable medium of claim 15, wherein setting the push message quota comprises setting the push message quota to a value greater than or equal to the determined first push message volume.

18. The computer-readable medium of claim 15, wherein adjusting the push message quota comprises:
   adjusting the push message quota to a value greater than or equal to the determined estimate of push message volume if the determined second push message volume is within a predetermined percentage of the determined estimate of push message volume; and
   adjusting the push message quota to a value less than or equal to the determined estimate of push message volume if the determined second push message volume is less than a predetermined percentage of the determined estimate of push message volume.

19. The computer-readable medium of claim 15, further comprising sending an alert if the determined second push message volume is greater than or equal to the determined estimate of push message volume.

20. The computer-readable medium of claim 15, wherein the executable instructions, when executed, further adjust the push message quota based on one or more of determined user base growth, historical message volume, successfully delivered messages, or application features.

* * * * *